US012754377B2

(12) United States Patent
Greer, III et al.

(10) Patent No.: US 12,754,377 B2
(45) Date of Patent: Oct. 6, 2026

(54) LASER SPARING ARCHITECTURES FOR MULTI-WAVELENGTH LASER ARRAYS

(71) Applicant: NVIDIA Corp., Santa Clara, CA (US)

(72) Inventors: Thomas Hastings Greer, III, Chapel Hill, NC (US); Benjamin Giles Lee, Ridgefield, CT (US)

(73) Assignee: Nvidia Corp., Santa Clara, CA (US)

( * ) Notice: Subject to any disclaimer, the term of this patent is extended or adjusted under 35 U.S.C. 154(b) by 270 days.

(21) Appl. No.: 18/534,132

(22) Filed: Dec. 8, 2023

(65) Prior Publication Data

US 2025/0189864 A1 Jun. 12, 2025

(51) Int. Cl.

*G02B 6/35* (2006.01)
*G02F 1/313* (2006.01)
*H04Q 11/00* (2006.01)

(52) U.S. Cl.

CPC ............. *G02B 6/354* (2013.01); *G02B 6/355* (2013.01); *G02B 6/3562* (2013.01); *G02F 1/313* (2013.01); *H04Q 2011/0043* (2013.01)

(58) Field of Classification Search

CPC .......... G02B 6/35; G02B 6/354; G02B 6/355; G02B 6/3562

See application file for complete search history.

(56) References Cited

U.S. PATENT DOCUMENTS

| | | | | |
|---|---|---|---|---|
| 4,341,438 | A * | 7/1982 | Seki | H04B 10/032 385/16 |
| 5,241,610 | A * | 8/1993 | Labiche | H04Q 11/0005 398/67 |
| 2002/0063918 | A1 * | 5/2002 | Kaiser | H04Q 11/0001 398/55 |
| 2005/0213972 | A1 * | 9/2005 | Aoki | H04B 10/508 398/49 |
| 2016/0381442 | A1 * | 12/2016 | Heanue | G02B 6/4269 398/45 |
| 2018/0183513 | A1 * | 6/2018 | Levesque | H04B 10/03 |
| 2019/0013870 | A1 * | 1/2019 | Ji | H04Q 11/0005 |
| 2020/0088940 | A1 * | 3/2020 | Bovington | G02B 6/12004 |
| 2023/0336248 | A1 * | 10/2023 | Nagarajan | H04B 10/66 |
| 2024/0259106 | A1 * | 8/2024 | Bigongiari | H04J 14/0297 |
| 2025/0310667 | A1 * | 10/2025 | Arbel | H04B 10/503 |

* cited by examiner

*Primary Examiner* — Michael Stahl

(74) *Attorney, Agent, or Firm* — Carnelian Law, LLC

(57) ABSTRACT

Optical circuit architectures utilizing primary laser light sources and at least one auxiliary laser light source. The primary lasers may be fixed-wavelength lasers and/or comb lasers, and the auxiliary lasers may be fixed-wavelength lasers, tunable-wavelength lasers, and/or comb lasers. In some cases optical switches are utilized along the optical paths in various configurations between the laser inputs and output terminals of the optical paths or between the laser inputs and a transform network.

17 Claims, 12 Drawing Sheets

LASER SPARING ARCHITECTURES FOR MULTI-WAVELENGTH LASER ARRAYS

BACKGROUND

FIG. 1A depicts a conventional optical chip or package 102 comprising a number N of primary laser sources 104 each generating a single-wavelength laser beam on a corresponding one of the inbound waveguides 106 to a transform network 108. The transform network 108 multiplexes the N single-wavelength beams from the N inbound waveguides 106 onto a number M of outbound waveguides 110 each carrying N beams of different wavelengths. The transform network 108 may be wavelength-selective or wavelength-insensitive.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1A:
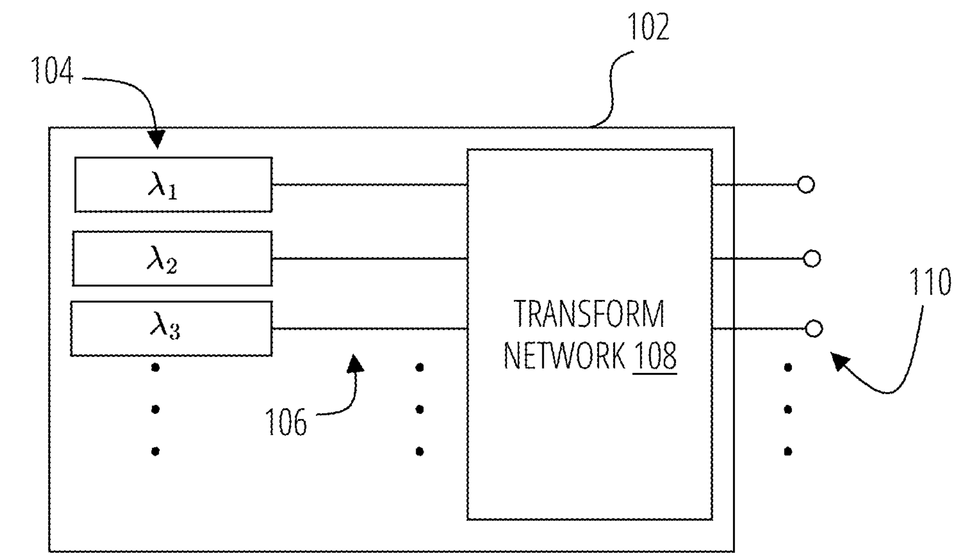
FIG. 1A PRIOR ART
FIG. 1A depicts a conventional optical circuit.

Optical circuits are herein disclosed that utilize 'laser sparing' mechanisms, i.e., mechanisms to activate spare laser sources when primary laser sources fail or are failing.

In some cases the optical circuits utilize multiple primary lasers and one or more auxiliary lasers, with a single optical switch configured between a primary laser input to each optical path and an output terminal of the optical path, and at least one optical switch configured between an auxiliary laser input to each optical path and the output terminal of the optical path. "Auxiliary laser" refers to a laser that is activated in response to a primary laser failure.

For example, the circuit may utilize a single optical switch configured along the optical path between each primary laser input and a transform network, and one, two, or more optical switches configured along the optical path between each auxiliary laser input and the transform network.

In some cases at least some of the primary lasers and the auxiliary lasers may be fixed-wavelength lasers. "Fixed-wavelength laser" refers to a laser configured to output light within a narrow band of wavelengths that for operational purposes may be treated as a single wavelength (e.g., centered in the band). Fixed-wavelength lasers in the context of this disclosure are not tunable, meaning they are designed to resist shifts in the value of the single wavelength they output in response to stimuli such as temperature or voltage variations.

For example at least one auxiliary laser may be a fixed-wavelength laser configured to output a same wavelength of light as one or more of the primary lasers. "Same wavelength" does not mean perfectly identical wavelengths, which is impractical in practice, but rather should be understood to mean that a wavelength has a value that is within operational constraints of another wavelength.

In some cases at least one auxiliary laser is a tunable-wavelength laser and some or all of the optical switches may be 2×2 optical switches. "Tunable-wavelength laser" refers to a laser configured to output light at a single wavelength (see the meaning of 'single wavelength' a used for a fixed-wavelength laser) at a value that is adjustable in response to stimuli such as temperature or voltage variations. Other technical features of these embodiments may be readily apparent to one skilled in the art from the following figures, descriptions, and claims.

In some cases, the circuit includes multiple optical paths (for example, arranged in parallel), multiple primary lasers, one or more auxiliary lasers, and optical switches arranged along the optical paths between the primary lasers and a transform network, the optical switches configured to switch light between adjacent optical paths. "Adjacent optical paths" refers to optical paths on a chip or package manufactured to extend substantially in parallel next to one another for at least a portion of their length.

In some cases first output terminals of the optical switches are connected to the transform network without passing their outputs through additional switches. "Output terminal" refers to a pin or other interface point on the boundary of a package, chip, or functional component.

The circuit may also include where first output terminals of the optical switches are coupled to inputs of optical switches on the adjacent optical paths, and second output terminals of the optical switches are coupled to inputs of optical switches on the adjacent optical paths.

The auxiliary lasers may be tunable-wavelength lasers and/or comb lasers, and the optical switches may be 2×2 optical switches. Other technical features of these embodiments may be readily apparent to one skilled in the art from the following figures, descriptions, and claims.

In some cases, the circuit includes multiple primary lasers configured to input light to a first transform network, a plurality of auxiliary lasers configured to input light to a second transform network, and logic (e.g., optical resonant rings) to merge outputs of the first transform network with outputs of the second transform network.

At least some of the primary lasers may be fixed-wavelength lasers and at least some of the auxiliary lasers may be tunable-wavelength lasers. In some cases, at least some of the primary lasers or auxiliary lasers are comb lasers.

Other technical features may be readily apparent to one skilled in the art from the following figures and descriptions for particular embodiments of the mechanisms described above.

Figure 1B:
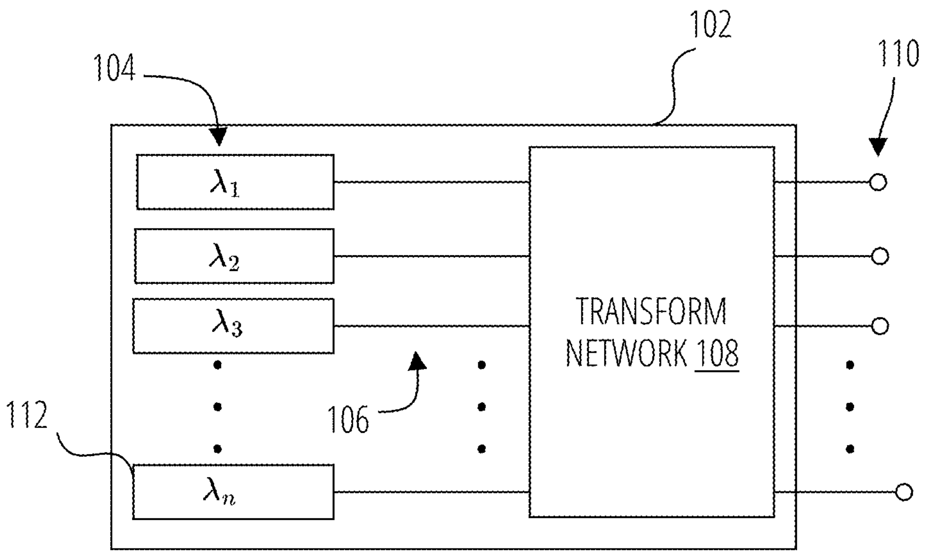
FIG. 1B depicts an embodiment of an optical circuit utilizing one or more auxiliary laser source.

FIG. 1B depicts an embodiment of an optical circuit utilizing a number L>=1 auxiliary laser sources 112. The transform network 108 multiplexes the N single-wavelength laser beams from the N primary laser sources 104 onto a number M of outbound waveguides 110 each carrying N light wavelengths, and also carrying L additional wavelengths from the auxiliary laser sources 112. The primary laser sources 104 and auxiliary laser sources 112 may all be fixed-wavelength lasers.

This embodiment may be utilized in implementations requiring that the ratio L/N of auxiliary laser sources 112 to primary laser sources 104 is small and may be implemented without utilizing optical switches. For at least these reasons, the impact on chip yield of the mechanism depicted in FIG. 1B may be low.

The beam generated by each auxiliary laser source 112 occupies a portion of the spectrum (i.e., bandwidth overhead) and when a primary laser source is lost and an auxiliary laser source 112 is activated, the spectrum is changed, requiring adaptation of the downstream link components. This downstream adaptation may take place automatically in response to the spectrum change, in manners known in the art.

FIG. 1C-FIG. 1F depict embodiments of switched direct-replacement laser sparing architectures.

Figure 1C:
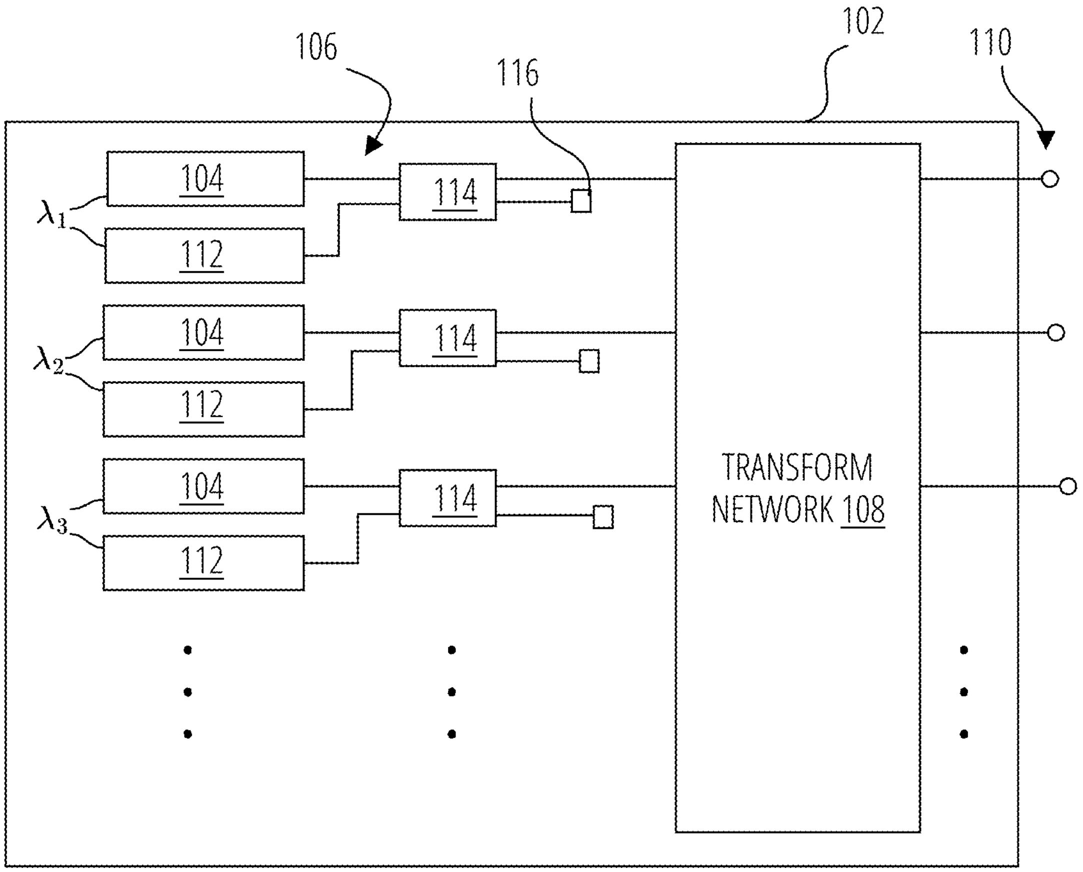
FIG. 1C-FIG. 1F depict embodiments of switched direct-replacement laser sparing architectures for optical circuits utilizing multiple single-wavelength lasers.

In the embodiment depicted in FIG. 1C, pairs of primary laser sources 104 and auxiliary laser sources 112 are formed, wherein within each pair, the primary laser source 104 and the auxiliary laser source 112 generate light of substantially the same wavelength.

The inbound waveguides 106 to the transform network 108 comprise, in this example, 2×2 switches 114 between each laser source and the transform network 108. The ratio of auxiliary laser sources to primary laser sources is 1:1. This unitary ratio may negatively impact production yield on the chips or packages 102.

The switches may for example be Mach-Zehnder optical switches, although other types of optical switches may also be utilized. The Mach-Zehnder optical switch commonly utilizes a Mach-Zehnder interferometer and comprises three main components: a first beam coupler, at least one phase modulator, and a second beam coupler. An incoming optical signal is first split into two equal parts using a first beam coupler. One part of the signal is sent to a first arm of the Mach-Zehnder interferometer, while the other part is directed to a second arm. In at least one of the arms, a phase modulator is used to alter the phase of the optical signal independently. These phase modulators are controlled (e.g., by a voltage or thermally), enabling the phase to be adjusted. The signals from the two arms of the Mach-Zehnder interferometer re-converge at the second beam coupler. If the signals are in-phase when they reach the second beam coupler, they constructively interfere and result in a higher intensity output on a first output port and a lower intensity output on a second output port. Conversely, if they are out of phase, they destructively interfere and create a lower intensity output on a first output port and a higher intensity output on a second output port.

By controlling the phase shift introduced by the modulators in the respective arms, the Mach-Zehnder switch can direct the incoming optical signal to exit either from one output or the other. The control logic for the switches may utilize optical power monitors 116 (e.g., detectors utilizing photodiodes) and taps on outputs of the various switches, in manners understood in the art. Not all of these taps or power monitors are depicted for all embodiments, but may be understood to be present for implementations utilizing Mach-Zehnder switches.

Figure 1D:
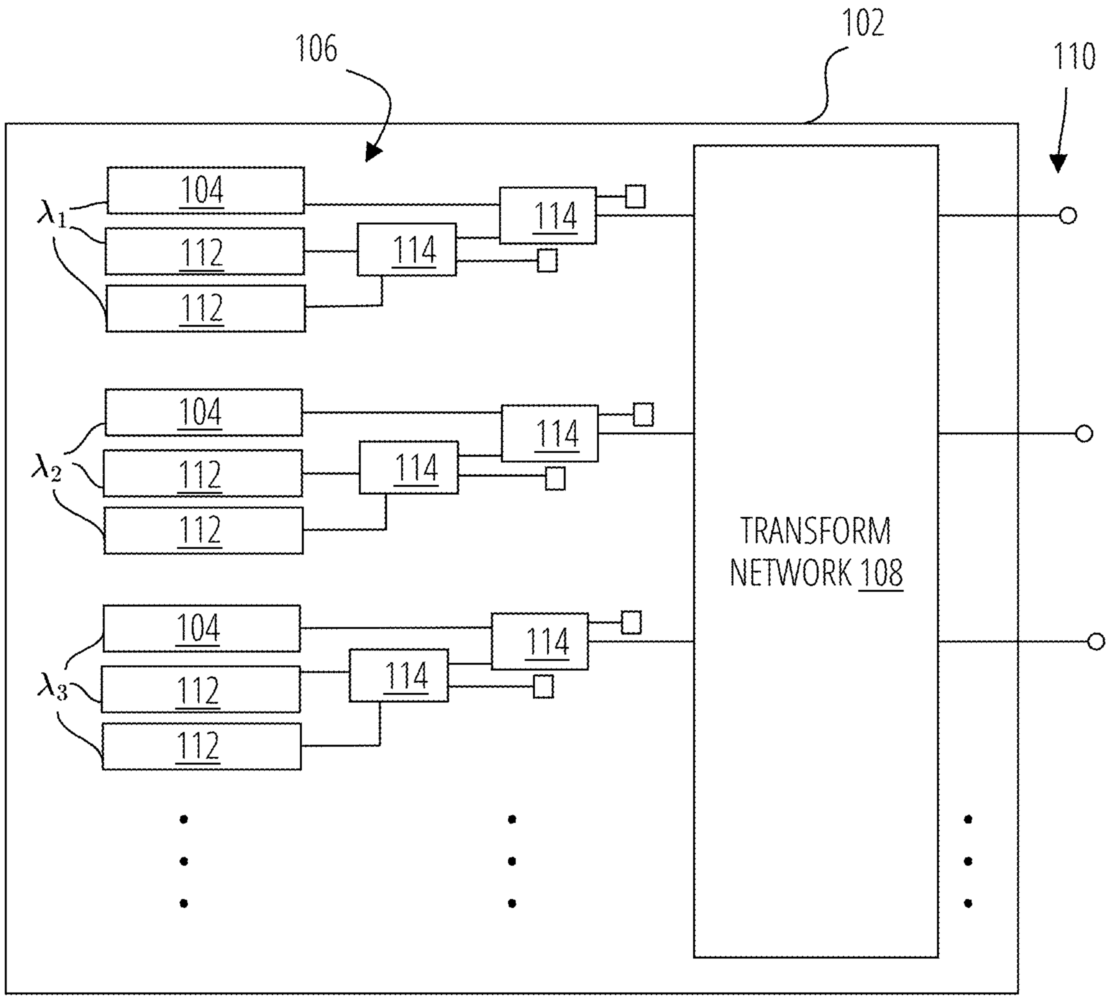

In the embodiment depicted in FIG. 1D, triplets comprising one primary laser source 104 and a pair of auxiliary laser sources 112 are formed, wherein within each triplet the primary laser source 104 and the auxiliary laser sources 112 generate light of substantially the same wavelength.

The inbound waveguides 106 to the transform network 108 comprise one 2×2 switch 114 along each optical path between primary laser sources 104 and the transform network 108 and two serialized 2×2 switches 114 along each optical path between auxiliary laser sources 112 and the transform network 108. In this embodiment the ratio of auxiliary laser sources to primary laser sources is 2:1, which may negatively impact production yield of the chips or packages 102. This embodiment may be generalized to higher ratios of auxiliary laser source to primary laser source, e.g., 3:1, 4:1 etc.

Figure 1E:
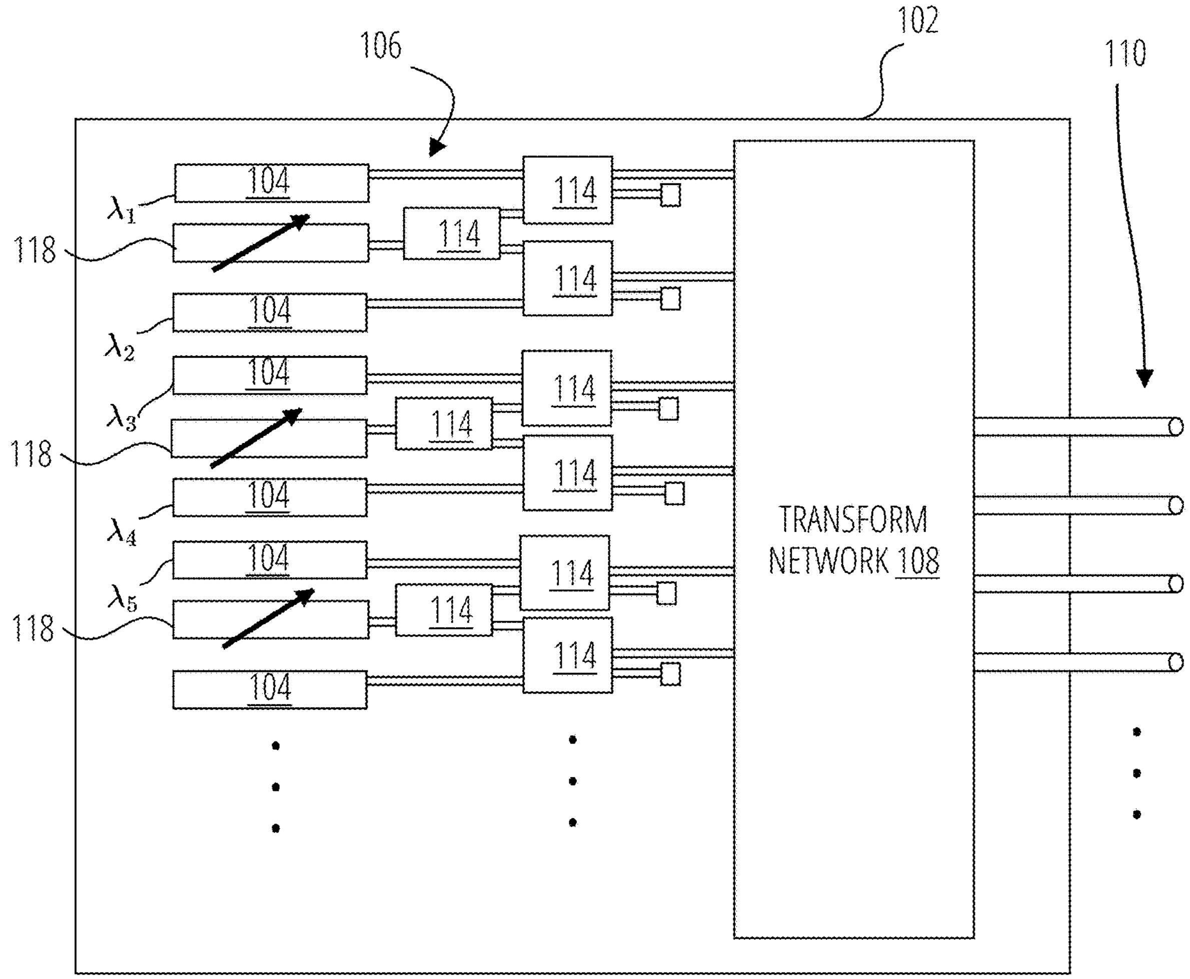

In the embodiment depicted in FIG. 1E, triplets comprising a pair of primary laser sources 104 and a shared variable auxiliary laser source 118 are formed, wherein within each triplet the primary laser sources 104 each generate light of different wavelengths, and output of the shared variable auxiliary laser source 118 is configured at the wavelength of a failed or failing one of the primary laser sources 104 and switched to the one of the inbound waveguides 106 previously utilized by the failed or failing primary laser source 104.

The inbound waveguides 106 to the transform network 108 comprise one 2×2 switch 114 between primary laser sources 104 and the transform network 108, and comprise two serialized 2×2 switches 114 between auxiliary laser sources 112 and the transform network 108. In this embodiment the ratio of auxiliary laser sources to primary laser sources is 1:2, which is less impactful on production yield of the chips or packages 102 than the 1:1 and 2:1 ratio embodiments described previously.

The range of wavelength tunability needed on a given one of the auxiliary laser sources 112 may be small due to proximity of the wavelengths generated by the fixed-wavelength lasers in its triplet, and thus may be achieved for example by utilizing temperature tuning mechanisms known in the art.

Figure 1F:
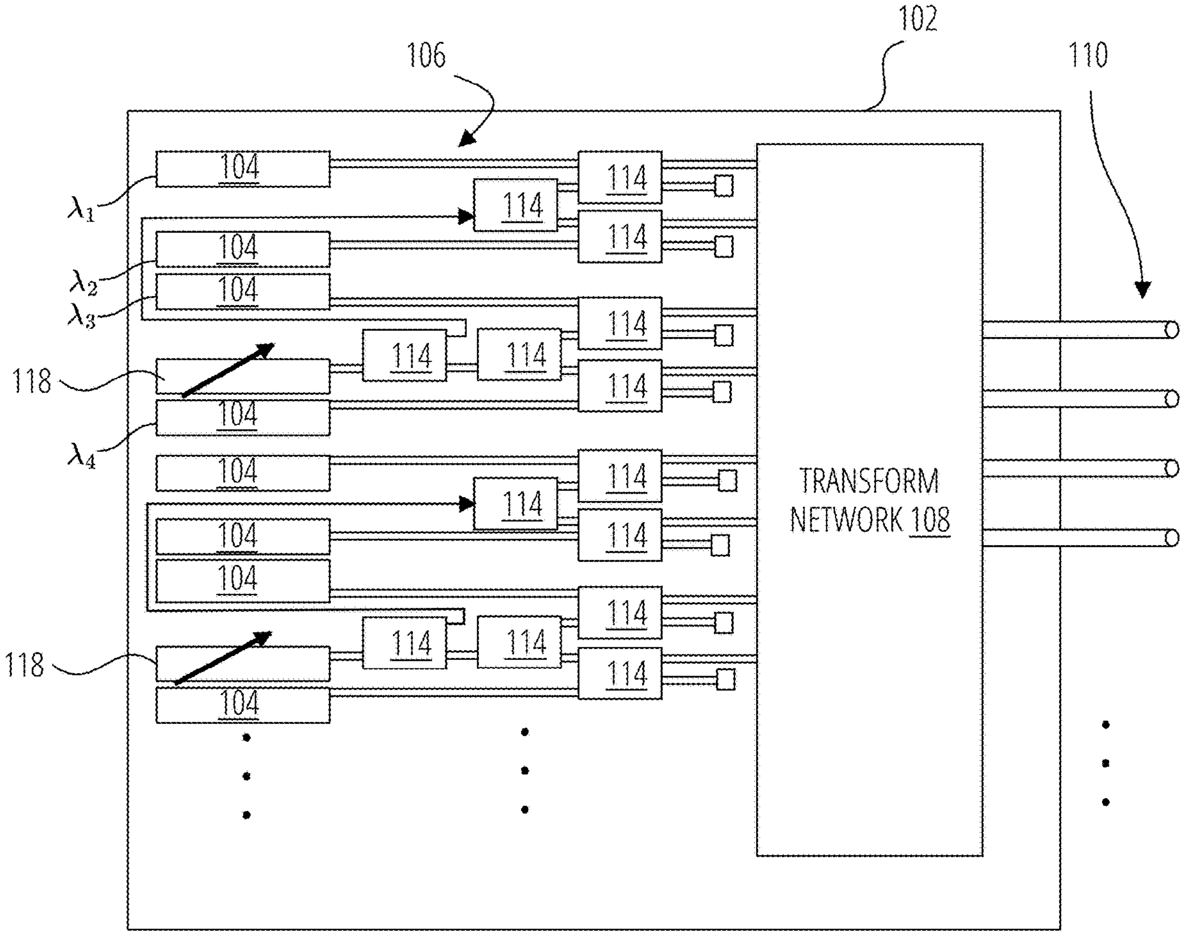

In the embodiment depicted in FIG. 1F, quintets comprising four primary laser sources 104 and a shared variable auxiliary laser source 118 are formed, wherein within each quintet the primary laser sources 104 each generate light of a different wavelength quintet. Light output from the shared variable auxiliary laser source 118 within a given quintet is configured to switch to the inbound waveguides 106 utilized by a failed or failing primary laser source 104 in the quintet.

The inbound waveguides 106 to the transform network 108 comprise one 2×2 switch 114 between primary laser sources 104 and the transform network 108, and three serialized 2×2 switches 114 between auxiliary laser sources 112 and the transform network 108. In this embodiment the ratio of auxiliary laser sources to primary laser sources is 1:4, which is less impactful on production yield of the chips or packages 102.

The range of wavelength tunability needed for the auxiliary laser sources 112 may be small and achievable for example by utilizing temperature tuning mechanisms known in the art.

In like fashion the ratio of auxiliary laser sources to primary laser sources may be further reduced by utilizing additional switches.

Figure 1G:
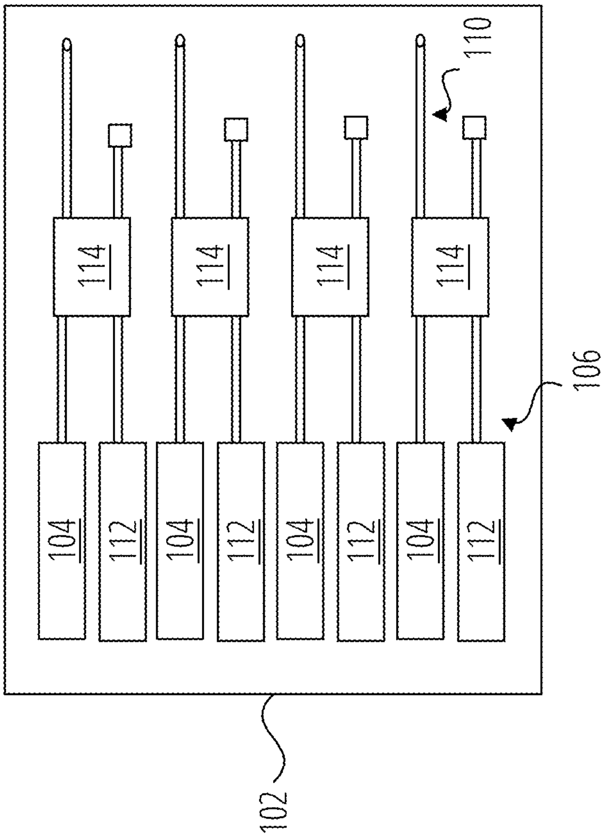
FIG. 1G depicts an embodiment of an optical circuit utilizing comb lasers for the primary laser sources to implement switched direct replacement without a waveguide transform network.

FIG. 1G depicts an embodiment of an optical circuit utilizing comb lasers for the primary laser sources 104 to implement switched direct replacement without a waveguide transform network. The primary laser sources 104 are paired with auxiliary laser sources 112. The primary laser sources 104 emit multi-wavelength light combs onto the inbound waveguides 106. The auxiliary laser sources 112 also emit combs onto the inbound waveguides 106, and a 2×2 switch 114 for each pair is configured to pass light to the outbound waveguides 110 from either the primary laser source 104 or the auxiliary laser source 112 of the pair. The auxiliary laser sources 112 need not be tunable in this embodiment. Embodiments of this type may be readily extended to utilize more than one auxiliary laser source 112 in accordance with the mechanisms described in FIG. 1D-FIG. 1F.

FIG. 2A-FIG. 2E depict embodiments of switched global-replacement laser sparing architectures for optical circuits utilizing multiple single-wavelength lasers.

Figure 2A:
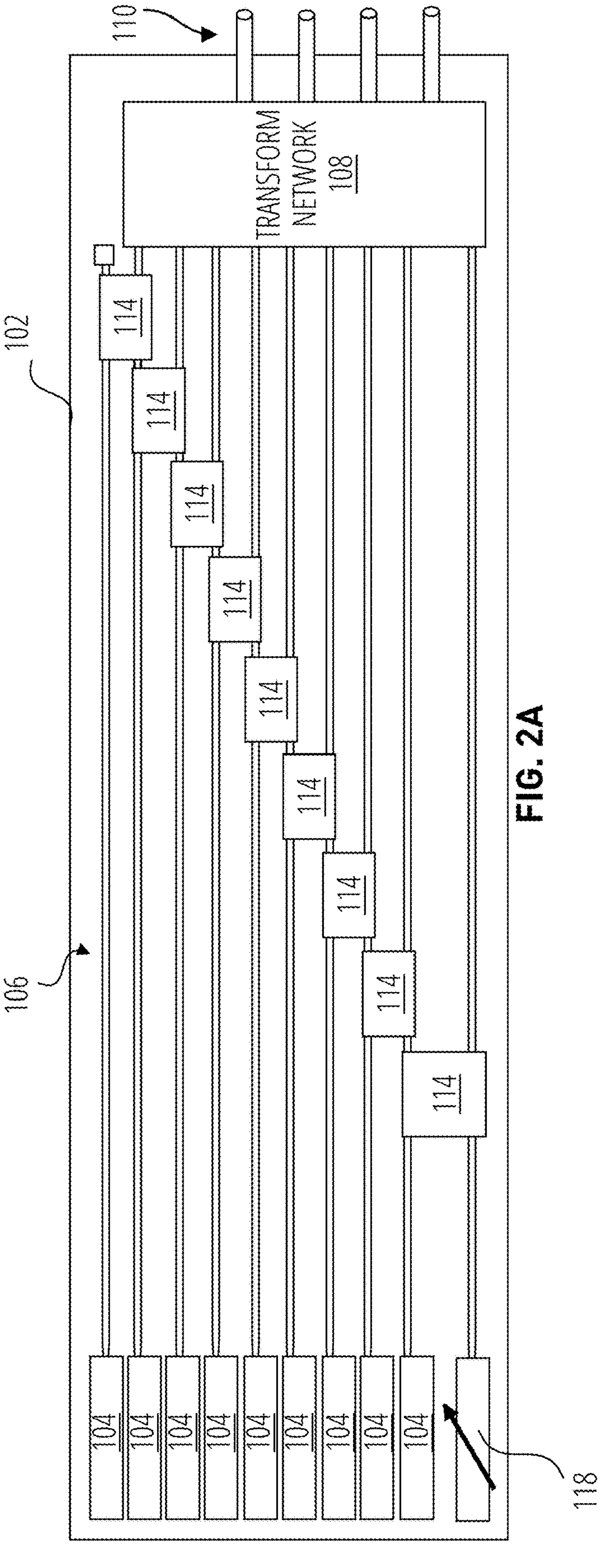
FIG. 2A-FIG. 2E depict embodiments of switched global-replacement laser sparing architectures for optical circuits utilizing multiple single-wavelength lasers.

The embodiment of FIG. 2A comprises a plurality N of fixed-wavelength primary laser sources 104 and one variable auxiliary laser source 118. A 2×2 switch 114 is disposed along the inbound waveguides 106 between each primary laser source 104 and the transform network 108. There are between one and N 2×2 switches 114 disposed along the inbound waveguides 106 between each variable auxiliary laser source 118 and the transform network 108, depending on how the light from the variable auxiliary laser source 118 is switched.

The impact on yield for this type of embodiment is generally low. For example, in the depicted embodiment the ratio of auxiliary laser sources to primary laser sources is 1:9.

Figure 2B:
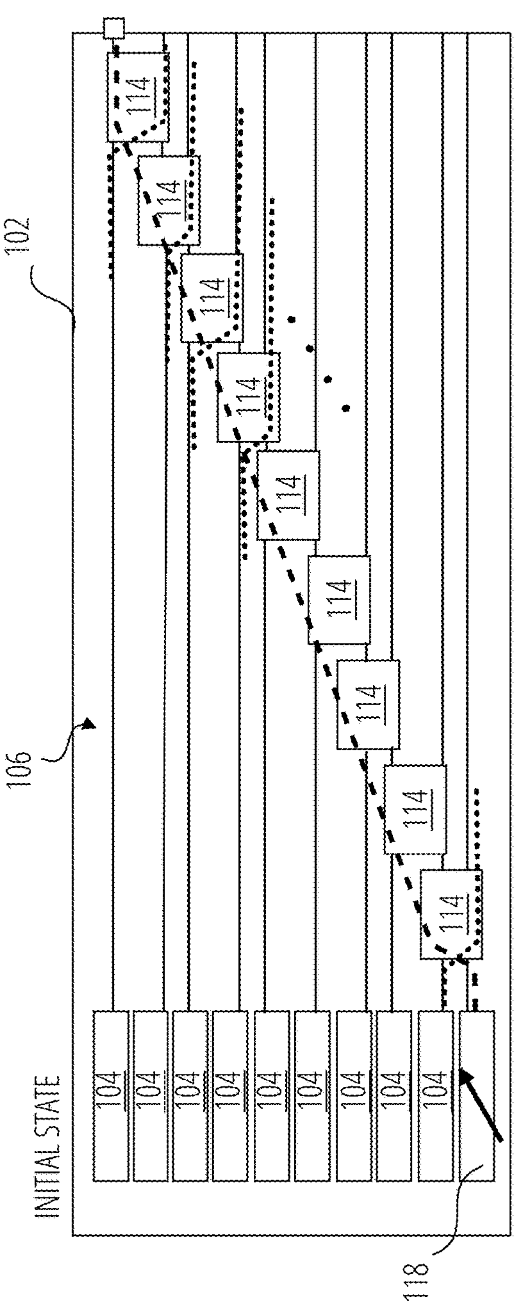

FIG. 2B depicts the switching of light onto the inbound waveguides 106 during an initial state of the chip or package 102 when all primary laser sources 104 are operational. The 2×2 switches 114 are configured to direct light from each of the operational primary laser sources 104 onto the inbound waveguides 106, and to direct light from the variable auxiliary laser source 118 to an output terminal (herein, a 'nonce' terminal) that is not utilized downstream (but may include an optical power monitor 116 and/or other switch control logic).

Figure 2C:
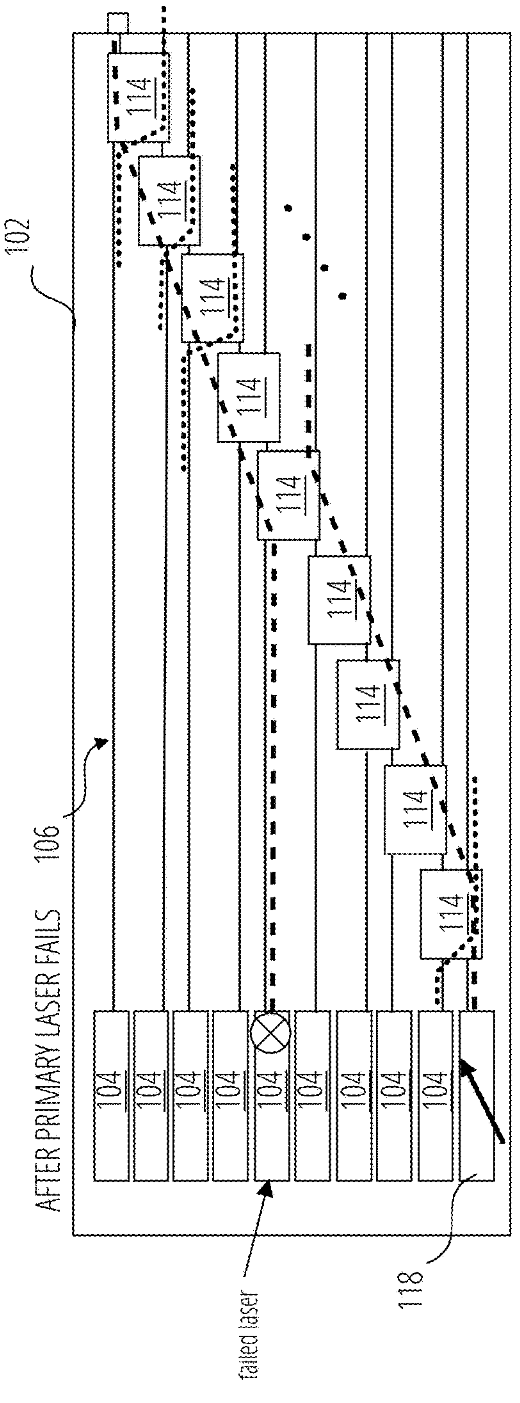

FIG. 2C depicts the switching of light onto the inbound waveguides 106 during a subsequent state of the chip or package 102 when one of the primary laser sources 104 has failed or is failing. The 2×2 switches 114 are configured to direct light from each of the operational primary laser sources 104 onto the inbound waveguides 106, to direct light from the failed or failing primary laser source 104 to the nonce output terminal, and to direct light from the variable auxiliary laser source 118 to the inbound waveguides 106 utilized in the initial state by the now unused primary laser source 104.

Figure 2D:
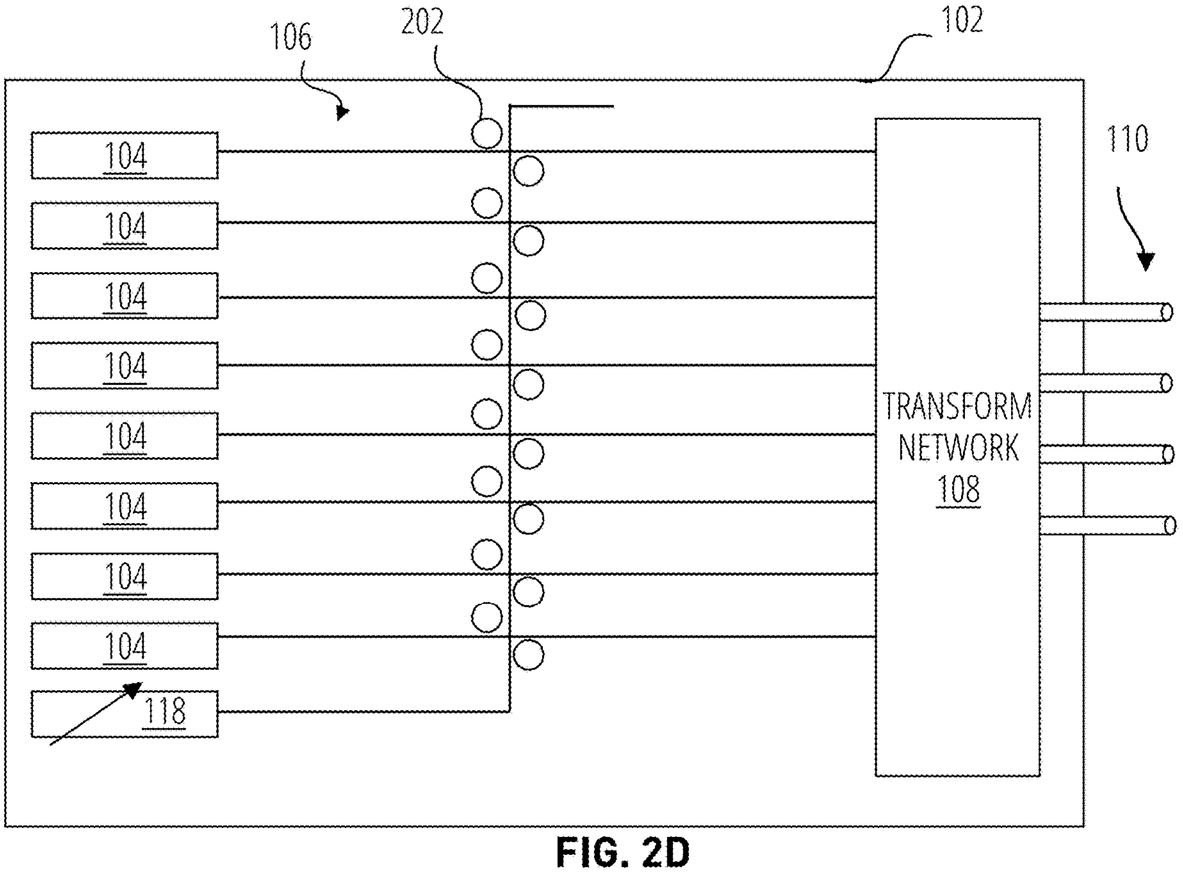

FIG. 2D depicts an example of the a switched global replacement embodiment described above utilizing optical resonant rings 202 for the 2×2 switches 114.

Figure 2E:
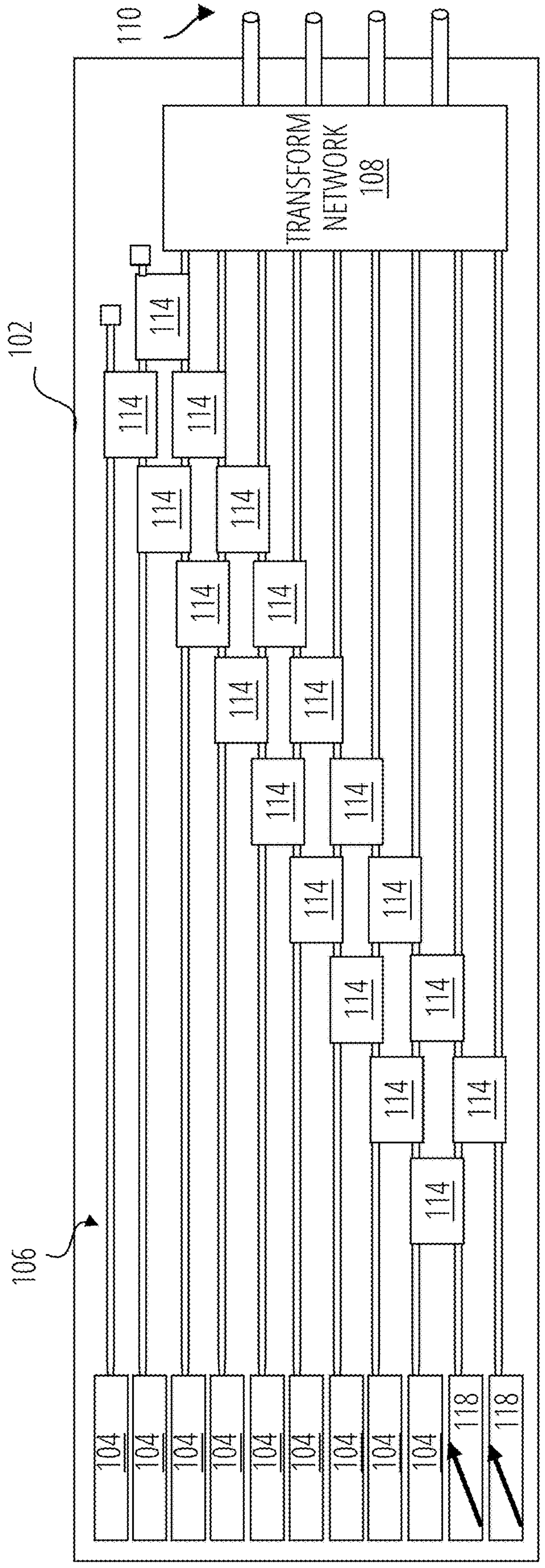

FIG. 2E depicts a switched global replacement embodiment extended to use two variable auxiliary laser sources 118. In like manner such mechanisms may be extended to embodiments utilizing three or more variable auxiliary laser sources 118.

Figure 2F:
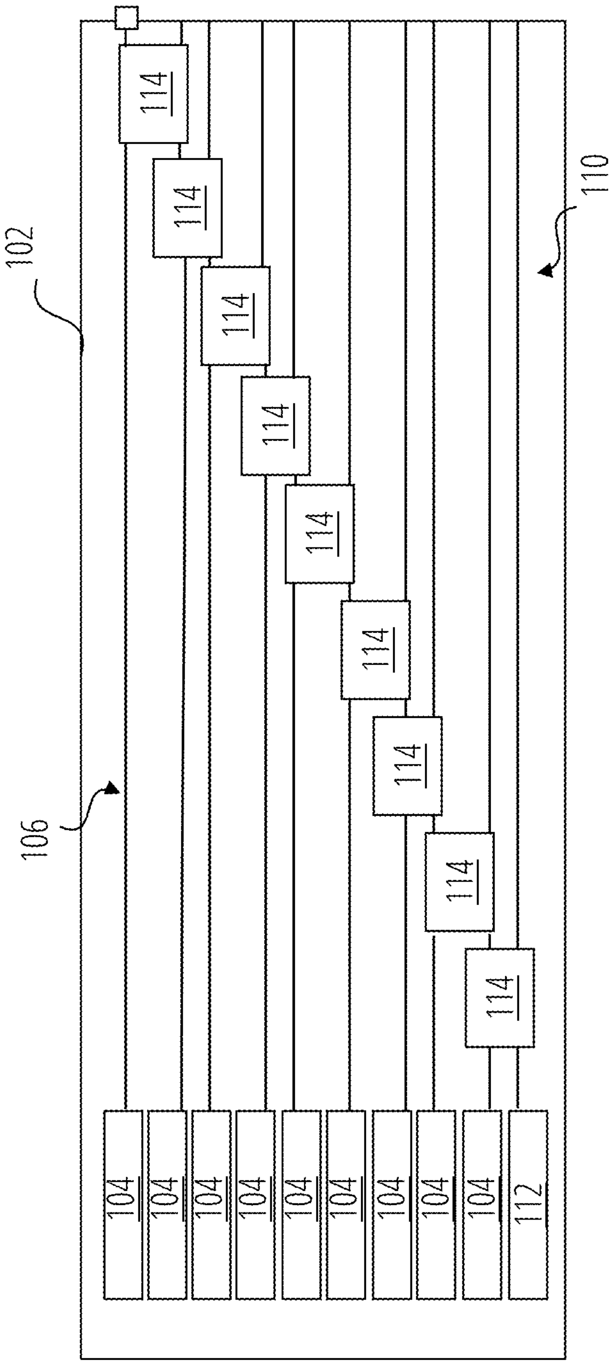
FIG. 2F depicts an embodiment of an optical circuit utilizing comb lasers for the primary laser sources to implement switched global replacement without a waveguide transform network.

FIG. 2F depicts an embodiment of an optical circuit utilizing comb lasers for the primary laser sources 104 to implement switched global replacement without a waveguide transform network. The primary laser sources 104 emit multi-wavelength light combs onto the inbound waveguides 106. The auxiliary laser source 112 also emits combs of light, and a sequence of 2×2 switches 114 determines how to pass those light to the outbound waveguides 110. The auxiliary laser source 112 need not be tunable in this embodiment. Embodiments of this type may be readily extended to utilize more than one auxiliary laser source 112 in accordance with the mechanisms described in FIG. 2E. One or more comb laser may also be utilized in the other embodiments described herein.

Figure 3:
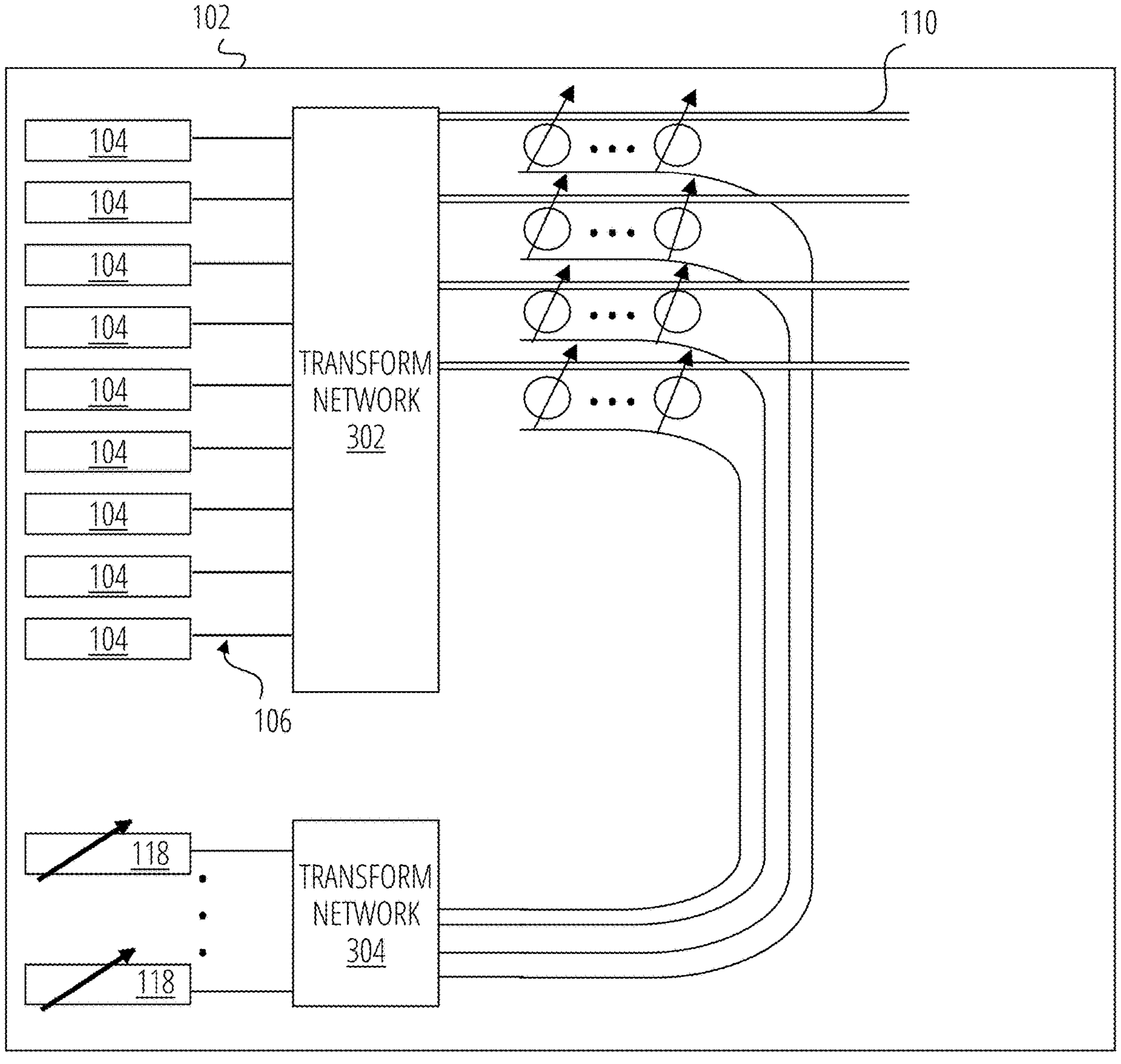
FIG. 3 depicts an embodiment of an optical circuit utilizing multiple single-wavelength lasers, multiple variable auxiliary laser sources, and multiple waveguide transform networks.

FIG. 3 depicts an embodiment of an optical circuit utilizing multiple single-wavelength lasers, multiple variable auxiliary laser sources, and multiple waveguide transform networks. Light from a number N of primary laser sources 104 are distributed on a number M of outbound waveguides 110 via an N: M transform network 302. Light from a number S of variable auxiliary laser sources 118 are merged into and distributed on the M outbound waveguides 110 via an S: M transform network 304 and various optical resonant rings.

LISTING OF DRAWING ELEMENTS

102 chip or package
104 primary laser source
106 inbound waveguides
108 transform network
110 outbound waveguides
112 auxiliary laser source
114 2×2 switch
116 optical power monitor
118 variable auxiliary laser source
202 optical resonant ring
302 transform network
304 transform network Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on. "Logic" refers to machine memory circuits and non-transitory machine readable media comprising machine-executable instructions (software and firmware), and/or circuitry (hardware) which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter). Logic symbols in the drawings should be understood to have their ordinary interpretation in the art in terms of functionality and various structures that may be utilized for their implementation, unless otherwise indicated.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it).

Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112 (f) for that claim element. Accordingly, claims in this application that do not otherwise include the "means for" [performing a function] construct should not be interpreted under 35 U.S.C § 112 (f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Having thus described illustrative embodiments in detail, it will be apparent that modifications and variations are possible without departing from the scope of the invention as claimed. The scope of inventive subject matter is not limited to the depicted embodiments but is rather set forth in the following Claims.

What is claimed is:

1. A circuit comprising:
a plurality of optical paths;
one or more primary lasers;
a plurality of auxiliary lasers;
a single optical switch configured between a primary laser input to each optical path and an output terminal of the optical path;
at least one optical switch configured between an auxiliary laser input to each optical path and the output terminal of the optical path;
a single optical switch configured along an optical path between each primary laser input and a transform network; and
at least one optical switch configured along the optical path between the auxiliary laser input and the transform network.

2. The circuit of claim 1, wherein at least some of the primary lasers and the auxiliary lasers are fixed-wavelength lasers.

3. The circuit of claim 1, wherein at least one auxiliary laser is a fixed-wavelength laser configured to output a same wavelength of light as one or more of the primary lasers.

4. The circuit of claim 1, wherein at least one auxiliary laser is a tunable-wavelength laser.

5. The circuit of claim 1, comprising a single optical switch along each optical path between the auxiliary laser input and the optical path output terminal.

6. The circuit of claim 1, comprising a plurality of optical switches along each optical path between the auxiliary laser input and the optical path output terminal.

7. The circuit of claim 1, wherein the optical switches are 2×2 optical switches.

8. A circuit comprising:
a plurality of optical paths;
a plurality of primary lasers;
one or more auxiliary lasers;
optical switches arranged along the optical paths, the optical switches configured to switch light between adjacent optical paths; and
the optical switches configured along the optical paths between the primary lasers and a transform network.

9. The circuit of claim 8, wherein first output terminals of the optical switches are connected to the transform network.

10. The circuit of claim 9, wherein second output terminals of the optical switches are coupled to inputs of optical switches on the adjacent optical paths.

11. The circuit of claim 8, wherein first output terminals of the optical switches are coupled to inputs of optical switches on the adjacent optical paths.

12. The circuit of claim 11, wherein second output terminals of the optical switches are coupled to inputs of optical switches on the adjacent optical paths.

13. The circuit of claim 8, wherein the auxiliary lasers are tunable-wavelength lasers.

14. The circuit of claim 8, wherein the auxiliary lasers are comb lasers.

15. The circuit of claim 8, wherein the optical switches are 2×2 optical switches.

16. A circuit comprising:

a plurality of optical paths;

a plurality of primary lasers;

one or more auxiliary lasers;

optical switches arranged along the optical paths, the optical switches configured to switch light between adjacent optical paths; and wherein the auxiliary lasers are tunable-wavelength lasers.

17. A circuit comprising:

a plurality of optical paths;

a plurality of primary lasers;

one or more auxiliary lasers;

optical switches arranged along the optical paths, the optical switches configured to switch light between adjacent optical paths; and wherein the auxiliary lasers are comb lasers.

* * * * *